United States Patent Office 3,374,105
Patented Mar. 19, 1968

3,374,105
PARTICULATE REFLECTIVE ELEMENTS AND
METHOD FOR FORMING THE SAME
Rene A. Bolomey, Peekskill, N.Y., assignor to The Mearl
Corporation, Ossining, N.Y., a corporation of New
Jersey
No Drawing. Filed July 2, 1964, Ser. No. 380,066
8 Claims. (Cl. 106—291)

This invention relates to particulate reflective elements. More particularly, the invention relates to nacreous pigments having as nacre- and, if desired, color-producing components high refractive index metal sulfide layers.

In the following specification all parts and percentages are given by weight, unless otherwise indicated.

Particulate reflective elements include particles having relatively small dimensions, e.g., up to about 10 millimeters, such as mica flakes, glass platelets, glass spheres, plastic particles, and lacquer- or resin-coated particles. Such particles may be used in the manufacture of road signs which are to be illuminated by automobile headlights, inpolarizers and in nacreous or pearlescent pigments.

Nacreous pigments are substances which produce a pearly luster. The pigment particles are platelets, at least parts of which consist of substances of high refractive index. Such pearlescent pigments may be applied as surface coatings, as in simulated pearls, or may be incorporated in plastics, as in plastic pearl buttons. In general, a pearly or mother-of-pearl-like appearance can be obtained whenever the platelets are incorporated in a sufficiently transparent film or other body.

The earliest nacreous pigment, natural Pearl Essence, contained plate-like crystals of guanine obtained from fish scales and other fish tissues. Early synthetic nacreous pigments were composed of basic lead carbonate, lead hydrogen phosphate, lead hydrogen arsenate, or bismuth oxychloride, all of which have relatively high refractive indices and are crystallizable in the form of platelets. Recently, more complex types of nacreous pigments have been developed. One such pigment is disclosed in Bolomey et al. Patent No. 3,123,490, granted Mar. 3, 1964, assigned to the assignee of the present invention. This pigment consists of platelets in which a layer of low refractive index, such as magnesium fluoride, is sandwiched between two layers of high refractive index, such as zinc sulfide. Another recently described complex nacreous pigment consists of coatings of titanium or zirconium oxide deposited upon transparent, lower refractive index particles.

If, as pointed out more fully hereinafter, the platelets of either the simple or complex types of nacreous pigment are provided in a particular range of thicknesses, and if the platelet thickness is sufficiently uniform, the nacreous pigment imparts color by light interference phenomena, as well as pearly luster to the object in or on which it is used. The color characteristics are unusual in that one color is seen by reflected and the complementary color by transmitted light. Such interference-colored nacreous pigments are therefore capable of producing a color play which is not obtained with conventional colored pigments, where the color is produced by the absorption of certain wavelengths of light.

The sandwich type of nacreous pigment described in the Bolomey et al. patent referred to hereinabove is produced by a vacuum evaporation procedure requiring the installation of relatively elaborate and costly process equipment. The preparation of the supported titanium or zirconium oxide pigments involves the use of less elaborate equipment, the pigments being formed by deposition from solution. Such procedure is disadvantageous, however, in that the titanium dioxide coating, for example, must be calcined at elevated temperature in order to produce a chemically stable film. Crystallization of the $TiO_2$ coating during the calcining operation leads to the formation of very tiny, microscopic crystallites which impair the smoothness and regularity of the coating. Thus, the pearl luster and the color intensity (in those cases in which the coating is of interference film thickness) are decreased considerably from that which would be obtained with an ideal, smooth coating. The thicker the coating, the greater the loss of quality which may thus result.

We have found that nacreous pigments or other reflective elements may be provided by depositing zinc or other sulfides on particulate substrates at atmospheric pressure, without necessitating the use of the special equipment required for the vacuum evaporation procedure. Furthermore, the sulfide coatings thus obtained possess remarkably uniform thicknesses and are free of imperfections, even after heating operations. Also, such zinc sulfide coatings produce a degree of pearl brilliance and, when deposited in interference film thicknesses, color intensities not attainable with previously known coated titanium or zirconium oxide pigments.

It is accordingly among the objects of the present invention to provide such a nacreous pigment, and other particulate reflective elements, having high refractive index light stable sulfide coatings formed on particulate substrates, which coatings impart superior brilliance and, in the case of interference-colored elements, provide color intensities heretofore unavailable.

A further object of the invention is to provide such reflective elements which may, if desired, be made luminescent.

Yet an additional object of the invention is to provide a process for the preparation of such elements, which is both relatively simple and economical to perform and which facilitates the production of products having improved light stability and exhibiting superior uniformity of light transmission and reflection characteristics.

The nature and objects of the invention will be more fully apparent from a consideration of the following detailed description thereof.

In the following detailed description, the invention is principally explained with reference to the production of nacreous pigments. It will, however, be understood that the preparation of other particulate reflective elements bearing the high refractive index stable sulfide coatings hereof and having maximum dimensions of up to about 10 millimeters is within the scope of the present invention.

Turning to the preferred embodiment of the invention, nacreous pigments are provided in accordance herewith, constituted of platelike pigment particles having substantially smooth surfaces and major dimensions of from about 3 to 100 microns, preferably 5 to 50 microns. Each such particle includes high refractive index layers formed on its opposite faces having substantially uniform thicknesses and constituted of a water-insoluble metal sulfide, which layers have optical thicknesses $Nd$ of from about 40 to 1,000 millimicrons ($m\mu$), wherein $N$ is the index of refraction of each layer and $d$ is its thickness.

The sulfide coated particulate pigment thus defined is prepared by suspending smooth, platelike supporting particles in an aqueous solution of a metal having a water-insoluble sulfide and an organic sulfur-containing compound which releases sulfide ions. The resulting reaction mixture is heated at temperatures of from about 60° C. to the boiling point of the mixture for a period of from about ¼ to 5 hours, with agitation, to produce the desired sulfide coating on the supporting particles, while maintaining the same in suspension. After separating the product particles from the suspension, they are dried and, preferably, heated at temperatures of from about 200° to 1,000° C. for a period of from about 1 to 4 hours to produce the desired nacreous pigment.

The nacreous pigment produced in accordance with the invention possesses a substantially uniform, imperfection-free sulfide coating which produces outstanding pearl brilliance and, when deposited in interference film thicknesses, provides color intensities unmatched by previously known complex nacreous pigments. Moreover, by heating the precipitated sulfide coating, as indicated hereinabove, the nacreous layer is converted to a form providing markedly superior light stability characteristics, as compared, for example, with the complex titanium or zirconium oxide pigments discussed above.

Additionally, it has been found that the sulfide coated nacreous pigments hereof may be provided in interference film thicknesses displaying higher order interference colors (which have the unusual optical effects described hereinafter), by a single deposition of the sulfide coating. When, on the other hand, it is desired to produce such higher order interference films employing complex titanium dioxide nacreous pigments, it is rather necessary to utilize a multiple coating technique such as disclosed, for example, in copending application Ser. No. 348,855, entitled Methods of Coating Surfaces With High Index Oxides, assigned to the assignee of the present invention.

It is preferred to employ a zinc sulfide coated nacreous pigment in the practice of the present invention. Zinc sulfide is substantially colorless and does not, therefore, impart any inherent absorption color to the product pigment. Also, the color of such pigment is, in the case of interference thickness, sulfide coatings, entirely attributable to interference effects unless, of course, the pigment substrate has an inherent absorption color. Moreover, the zinc sulfide containing pigment provides excellent light stability and may, if desired, be so prepared as to provide, for the first time, a luminescent nacreous pigment.

It is, however, possible to form nacreous pigments in accordance with the invention incorporating other metallic water-insoluble sulfides, by reacting water-soluble salts or complexes of such metals with organic sulfur containing compounds. The sulfides of cobalt, lead, mercury, manganese, cadmium, arsenic, antimony, nickel, iron, copper, bismuth or tin may, for example, be so employed. When, as indicated above, the sulfide coating comprises zinc sulfide, the colors displayed by the coating are entirely attributable to interference effects. With other sulfides, the colors are a combination of interference colors and the inherent absorption color of the particular sulfide. An $SnS_2$ coating, for example, of such thickness as to have a red interference reflection color appears red when seen by specular reflectance and yellow when seen at other angles. An NiS coating of a thickness which produces green reflection appears green by specular reflectance and black at other angles. Accordingly, while the following description is principally directed to the formation of a zinc sulfide coated nacreous pigment, in accordance with a preferred form of the invention, it will be understood that the invention includes within its scope the production of nacreous pigments or other particulate reflective elements incorporating other high refractive index water-insoluble metal sulfide coatings as specified hereinabove.

The thin sulfide coated pigment particles possess the characteristics of nacreous pigments displaying, in the case of zinc sulfides, a bluish or whitish reflection when the zinc sulfide layer has a thickness of from about 20 to 60 m$\mu$. When the thin film or layer of zinc sulfide is slightly thicker the rays reflected from its opposite surfaces may interact, resulting in the reinforcement or destruction of light of certain wavelengths, the pigment particles thus appearing colored when they are illuminated with white light.

Destruction interference of a given wavelength occurs if the reflections from the two surfaces of the film are completely out of phase. This occurs, for light perpendicularly incident on the film, for wavelengths $\lambda$ when $$Nd = (n-1)\lambda/2 \qquad (1)$$

where

N is the index of refraction of the film,
$d$ is its thickness, and
$n$ is a small integer, e.g., 1, 2, 3, etc.

If the incident light is monochromatic and of wavelength $\lambda$, this well-known equation predicts that there would be no reflection at all. If on the other hand, the film is illuminated by white light, all wavelengths except $\lambda$ appear in the reflection.

Reinforcement of a given wavelength occurs if the reflections from the two surfaces of the film are in phase with one another. For light perpendicularly incident on the film, this occurs when $$Nd = (2n-1)\lambda/4 \qquad (2)$$

the terms being defined as above.

The index of refraction N for zinc sulfide is about 2.3. The smallest film thickness which can produce color by destructive interference is that which will cause the shortest wavelength in the visible spectrum, i.e., violet blue, to be eliminated from the reflected light. Taking $\lambda$ for light of this color as 400 m$\mu$, the thickness of the film necessary to produce this effect is approximately 87 m$\mu$.

The resulting reflected light has the color complementary to that which is eliminated from the reflection, or yellow in the present instance. Thus, the thinnest film capable of producing a color by destructive interference has a yellow reflection color. Films which reflect red, violet, blue, and green, are progressively thicker.

Beginning at violet, the reflection color which is produced by the elimination of a particular wavelength is enhanced by a reinforcement color in accordance with Equation 2.

The approximate thicknesses of the zinc sulfide films necessary to produce nacreous pigments displaying various interference colors are indicated in the following table:

TABLE I.—OPTICAL THICKNESSES OF ZINC SULFIDE-CONTAINING NACREOUS PIGMENTS

| Reflection Color | Source | Approx. Optical Thickness, $Nd$ (m$\mu$) | Approximate Thickness, (m$\mu$) if N=2.3 |
|---|---|---|---|
| Yellow | Elimination of violet-blue, approx. 400 m$\mu$. | 200 | 87 |
| Magenta | Elimination of green, approx. 520 m$\mu$. | 260 | 113 |
| Purple | Elimination of yellow, 590 m$\mu$; Reinforcement of violet, 400 m$\mu$. | 300 | 130 |
| Blue | Elimination of orange, 610 m$\mu$; Reinforcement of blue, 480 m$\mu$. | 320 | 139 |
| Green | Elimination of red, 650 m$\mu$; Reinforcement of green, 590 m$\mu$. | 360 | 156 |
| 2nd Yellow | Elimination of blue, 440 m$\mu$; Reinforcement of yellow, 590 m$\mu$. | 440 | 191 |
| 2nd Red | Elimination of blue-green, 490 m$\mu$; Reinforcement of red, 650 m$\mu$. | 490 | 213 |
| 2nd Blue | Elimination of yellow, 575 m$\mu$; Reinforcement of blue, 460 m$\mu$. | 575 | 250 |
| 2nd Green | Elimination of red, 650 m$\mu$; Reinforcement of green, 520 m$\mu$. | 650 | 282 |

The description second (2nd) yellow, second (2nd) red, etc., is used herein to describe the second occurrence with increasing thickness of each of the colors, in preference to the terms "second order yellow," etc. The usual definition of higher order interference colors by order number is not always consistent with the value of $n$ in interference Equations 1 and 2 above, $n$ also occasionally being referred to as order. Hence, the nomenclature given above has been here used instead.

Further increases in the thickness of the zinc sulfide layer, beyond that specified for the second green reflection, result in the production of third reflection colors. The interference film displaying a third green has an approximate optical thickness of 1,000 mµ. Interference films having greater optical thicknesses do not possess the color intensity of the second and third colors and are relatively uneconomical to produce.

The interference colors thus provided are dependent upon the angle of observation (the colors indicated in Table I being those displayed at perpendicular incidence), the colors shifting to the wavelengths which correspond to thinner films as the angle of incidence increases, i.e., as the direction of the incident light departs from the normal to the surface. The first reflection colors show a moderate shift of wavelength with variation of the angle of observation; hence, green goes to blue, blue to purple, magenta to orange, and gold to a pale yellow shade. The second colors, on the other hand, display a much wider shift of the reflected wavelength, second green changing to blue and then to purple with increasing angle of incidence, second blue changing to purple and then to red, second red changing to greenish-gold, and second gold changing to bluish-green. By coating such nacreous pigments displaying higher interference colors on dark, curved surfaces it will be seen that remarkable iridescent effects can be achieved. Similar effects may also be obtained by incorporating the second interference film pigments in plastics, with the pigment particles oriented in non-planar patterns.

The nacreous pigments hereof are prepared by depositing the zinc or other sulfide from an aqueous solution, using an organic sulfur-containing compound as the source of sulfide. It has been found that the conventional method of forming zinc sulfide by bubbling $H_2S$ gas through a solution of a zinc salt is highly unsatisfactory as a procedure for coating the particulate substrates employed herein. The precipitation of zinc sulfide with $H_2S$ results merely in the formation of distinct ZnS particles, which show little or no tendency to coat and adhere to particulate material which may be present. It has been found, however, that a smooth, adherent film of ZnS may be deposited if the source of sulfide is an organic sulfur-containing compound such as thioacetamide, thiourea, thioglycolic acid, thioacetic acid, thioformamide, or thiosalicylic acid.

The source of zinc for the reaction is a zinc compound soluble in the aqueous medium, employed in an amount expressed as ZnO of from about 0.25 to 7.5%, preferably from 0.5 to 3.5% of the solution. Suitable soluble salts include zinc acetate, zinc chloride, zinc sulfate, zinc formate and zinc nitrate. Zinc oxide may also be used, and is more economical for coating reactions carried out in strongly alkaline media.

The concentration of sulfur compound generally depends on the zinc concentration. An equimolar ratio of sulfur to zinc is desirable, but satisfactory results are obtained employing molar proportions from about 0.5 to 3 moles sulfur per mole zinc.

The particulate substrate upon which the zinc or other sulfide coating is deposited, in accordance with the invention, is in the form of substantially smooth platelets having a major dimension of from about 5 to 50 microns, and a thickness of from about 50 to 2,000 millimicrons. Preferably, the substrate material comprises plate-like mica flakes which are desirably those of muscovite. Other types of mica flakes may however also be used, such as biotite, phlogopite, vermiculite, and various synthetic micas, especially those which resemble natural white mica. The mica particles preferably are of the "water ground" variety, of from about 150 to 400 mesh, and having surface areas, as determined by the BET method, of from about 2 to 6 square meters per gram. Particularly satisfactory results have been obtained employing fractions which pass through 200, 325, or 400 mesh screens, and which are substantially free of very fine particles.

While it is preferred to utilize mica platelets for the pigment substrate, other particulate materials having the dimensions specified hereinabove may be employed in accordance with the present invention. Hence, the nacreous pigment may also be formed by depositing the sulfide coating upon platelets constituted of glass, plastics, etc.

The acidity of the reaction mixture is regulated in accordance with the specific organic material utilized as the sulfide source. When thioacetamide is so employed, the reaction is carried out in acidic solution, preferably within a range of from about pH 2.0 to 5.0, desirably from 3.5 to 4.5. The solution may be adjusted to the desired pH range, with for example, formic acid, hydrochloric acid, sulfuric acid, or nitric acid.

When, on the other hand, thiourea is utilized as the source of sulfide, the reaction is conducted in alkaline solution at a concentration of sodium hydroxide or other strong base of from about 0.25 N to 5 N, desirably from 0.5 N to 3 N. Suitable alkalies are sodium hydroxide, potassium hydroxide and tetramethyl ammonium hydroxide.

The deposition reaction is carried out by heating the aqueous mixture containing the zinc salt, the organic sulfur-containing compound and the particulate substrate at elevated temperatures of from about 60° C. to the boiling point of the aqueous system, for a period of from about ¼ to 5 hours. It will be understood that within the indicated ranges, longer reaction times are required when the reaction mixture is heated at lower temperatures. The mica or other substrate is thereby maintained in suspension and the zinc sulfide coating deposited thereon in substantially amorphous form to produce the desired nacreous pigment.

The pigment particles are thereafter separated and dried, e.g., at about 110° C. and preferably, subjected to heat treatment at temperatures of from about 200° C. to 1,000° C. The light stability of the sulfide-coated pigment which has been dried at 110° C. and not subjected to a subsequent heat treatment is markedly superior to the stability of non-heat treated titanium dioxide complex nacreous pigments referred to hereinabove, the latter being subject to severe chalking.

Desirably, however, the sulfide-coated pigment is subjected, after drying, to heat treatment at temperatures of from 200° to 1,000° C. in air or within an inert atmosphere. At the higher temperatures within the indicated range it is preferred to effect the heat treatment in nitrogen or other non-oxidizing gas, e.g., helium, argon, carbon dioxide, etc.

It has been found that the heat treatment increases the density of the sulfide coating, causing an increase in the refractive index thereof which increases reflectivity and reduces the thickness of the film, shifting the interference colors accordingly. Zinc sulfide coated platelets subjected to such treatment retain their smooth surfaces whereas titanium dioxide coated pigments, for example, become somewhat roughened during the shrinkage accompanying the heat treatment. Such roughening tends to reduce specular reflectance and increase light scattering. The avoidance of light scattering from the coated platelets is of particular importance with coatings of interference thickness since smooth surfaces (which do not cause such scattering) provide maximum color intensity. Heating the sulfide coated pigment at temperatures of the order of 200° C. or higher thus markedly increases light stability without impairing the smoothness of the coating surfaces.

Employing heat treatment temperatures of about 700° C. or higher, it has been found that substantially total conversion of the amorphous zinc sulfide coating to its crystalline form (sphalerite) is effected. This increase in crystallinity further increases light stability and has been found to produce a marked increase in refractive index and reflectivity of the pigment surfaces, unexpectedly without impairing the smoothness thereof.

The following examples illustrate preferred embodiments of the method for forming the particulate reflective elements of the present invention:

Example 1.—White pearl pigment

Zinc acetate dihydrate (40 parts by weight) and thioacetamide (14 parts) were dissolved in 890 parts of water. To the solution were added 48 parts of mica flakes (water ground muscovite with a surface area, as determined by the BET method, of 4 square meters per gram).

The suspension was brought to pH 4.0 with 43 parts of formic acid. The reaction mixture was thereafter heated to boiling with agitation to keep the mica well suspended, and refluxed for 90 minutes, after which the zinc sulfide-coated mica was filtered, washed with water, and dried at 110° C. to produce a lustrous white pearl product.

Microscopic examination by reflected light at 1,000 × magnification revealed a smooth and uniform zinc sulfide coating on the mica flakes.

Light stability of the resulting pigment was determined by coating pigment samples in a nitrocellulose lacquer employing a doctor blade device, and then subjecting the coatings to exposure in a Fade-O-Meter. The coating formulation consisted of 4% of the coated flakes in a clear, unstabilized cellulose lacquer of the following composition:

|  | Percent |
|---|---|
| Nitrocellulose 15/20 second RS type | 3.0 |
| Nitrocellulose 30/40 second RS type | 6.5 |
| Ethanol | 5.1 |
| n-Butyl acetate | 85.4 |
|  | 100.0 |

After exposure for 55 hours, the nitrocellulose film had become slightly brown.

Example 2.—Light stabilized pearl pigment

The dried flakes produced as described in Example 1 were heated for one hour at 300° C. in air. The light stability of the heated pigment was measured by making a 4% suspension of the coated mica flakes in nitrocellulose lacquer, and making the suspension into a drawdown which was tested for light stability as indicated in Example 1. Light stability was increased to 85 hours, as compared with the 55 hour period evidenced by the pigment produced in accordance with Example 1.

Example 3.—Light stabilized pearl pigment

A further sample of the dried pigment produced in Example 1 was heated for one hour at 700° C. in nitrogen, and tested for light stability by the technique described above. The light stability was thereby increased to more than 100 hours.

Examples 4–11.—Interference colored pigments

The procedure of Example 1 was repeated, except that the ratio of mica to zinc salt was decreased in order to obtain thicker zinc sulfide coatings which produced color by light interference phenomena. Several pigment samples were produced by reacting the zinc acetate dihydrate and thioacetamide in 890 parts water, employing sufficient formic acid in each case to adjust the acidity to pH 4.

The reactant proportions utilized (in parts by weight) to produce pigments displaying different interference colors are indicated in the following table:

TABLE II.—INTERFERENCE COLORED ZINC SULFIDE MICA PIGMENTS (A) REACTANT PROPORTIONS EMPLOYED

| Example | Mica | $ZnC_2H_3O_2 \cdot 2H_2O$ | Thioacetamide | Formic Acid |
|---|---|---|---|---|
| 4 | 35.5 | 48.0 | 16.5 | 51.6 |
| 5 | 33.2 | 49.7 | 17.1 | 53.5 |
| 6 | 26.2 | 55.9 | 19.2 | 60.0 |
| 7 | 22.5 | 57.7 | 19.8 | 62.0 |
| 8 | 21.2 | 58.7 | 20.2 | 62.2 |
| 9 | 20.0 | 60.0 | 20.6 | 64.5 |
| 10 | 16.0 | 61.8 | 21.2 | 66.5 |
| 11 | 14.0 | 63.7 | 21.8 | 68.5 |

(B) CHARACTERISTICS OF PRODUCT PIGMENTS

| Example | Reflection Color | Approx. $Nd$, $m\mu$ | Thickness ($m\mu$) for $N=2.1$, approx |
|---|---|---|---|
| 4 | Gold | 200 | 95 |
| 5 | Magenta | 260 | 124 |
| 6 | Blue | 320 | 152 |
| 7 | Green | 360 | 171 |
| 8 | 2nd gold | 440 | 210 |
| 9 | 2nd red | 490 | 233 |
| 10 | 2nd blue | 575 | 274 |
| 11 | 2nd green | 650 | 310 |

The indicated colors were those displayed by the coated flakes when seen against a black background.

The pigment products were heated at 500° C. for 60 minutes, the heat treatment imparting markedly improved light stability to the pigments and effecting no significant changes in their colors. Examination of each of the product pigments by reflection microscopy at 1,000 × revealed that all the coatings thus formed were smooth and uniform and remained so even after heat treatment to improve light stability.

Further heat treatment at 700° C. in nitrogen caused a shift in color to that corresponding to a slightly thinner film, the coatings remaining smooth and uniform when examined by reflection microscopy at 1,000 ×.

Example 12.—Plural interference colored pigments produced during a single deposition operation Since the nacreous zinc sulfide coating on the substrate particles builds up in a regular fashion, pigments of various colors may be produced during the course of a single sulfide deposition by periodically withdrawing pigment samples before the run is completed. For this purpose, the reactants of Example 11 were utilized in the precipitation procedure of Example 1, aliquot product portions being withdrawn after various time intervals. The flakes were dried at 110° C., and made into nitrocellulose drawdowns. The reflection colors of the drawdowns are indicated in the following table:

TABLE III.—PIGMENT SAMPLES PRODUCED DURING SINGLE ZnS DEPOSITION

| Time after reaching boiling point min. | Reflection color |
|---|---|
| 35 | "White." |
| 42 | Gold. |
| 45 | Red. |
| 47 | Violet. |
| 50 | Blue. |
| 54 | Green. |
| 56 | 2nd gold. |
| 60 | 2nd red. |
| 65 | 2nd blue. |
| 76 | 2nd green. |

Example 13.—White pearl pigment produced using thiourea

Mica flakes were coated with a thin zinc sulfide layer, employing thiourea as the source of sulfide ions.

To 2442 parts of water were added 108 parts zinc acetate dihydrate and 378 parts 50% NaOH solution. 72 parts of thiourea were then added. The clear solution was added to an agitated suspension consisting of 140 parts mica flakes in 1460 parts water.

The suspension was agitated to keep the mica flakes dispersed, and was heated at such a rate that boiling commenced in approximately 60 minutes. The reaction was completed after about 150 minutes, heating under reflux. The zinc sulfide-coated mica flakes were thereafter recovered by filtration, washed with water, and dried at 110° C. to produce a white pearl nacreous pigment. Examination by reflection microscope demonstrated that the coating was smooth.

Example 14.—Interference colored pigment produced using thiourea

The procedure of Example 13 was followed, except that the mica quantity was reduced in order to obtain a coating which reflected second green.

Instead of 140 parts mica flake, only 24 parts were used. The dried platelets had a second green reflection color, and a coating containing these platelets displayed an extreme shift in color with angle of observation. Reflection microscopy revealed that the coating was smooth.

Example 15.—Luminescent nacreous pigment 500 parts of the dried product prepared in accordance with the procedure of Example 1 were mixed with 2 parts NaCl and 0.0211 part $CuCl_2$. The mixture was heated to 850° C. in about 1 hour, and then permitted to cool in the air. Finally, the product was washed with water saturated with $H_2S$.

The resultant phosphor luminesced green, with a moderate green afterglow, on radiation with ultraviolet light of wavelength 3650 A. The inherent high reflectivity of the product increased the intensity of the fluorescence beyond that which is observed with ordinary luminescent zinc sulfide.

When other activators are substituted for the copper salt indicated above other luminescent characteristics may be obtained. Hence, the use of a manganese salt activator results in the production of an orange luminescent product, and a silver salt activator, for example, imparts blue luminescence to the pigment.

Example 16.—White pearl pigment on glass flakes

The Example 1 procedure was repeated, except that the quantity of water was doubled and the 48 parts of mica were replaced by 290 parts of glass flakes with an average thickness of 1 to 2 microns. The coating reflected white light.

The product was first dried at 110° C., and then heat treated as in Example 2.

When cast in a panel of polyester resin, the coated flakes reflected light effectively, and could be used in the production of light polarizing panels. The original uncoated flakes were ineffective for such purpose because of the low order of reflectivity of glass in polyester, the two substances having refractive indices which approximate one another.

Example 17.—White reflective elements on glass spheres

The procedure of Example 1 was followed, except that the quantity of water was trebled and the mica flakes replaced by 580 parts of glass spheres with an average diameter of 30 microns and an index of refraction of approximately 1.5.

On incorporation in a clear paint vehicle, the glass spheres displayed greatly increased reflectivity as compared with the uncoated glass spheres.

Example 18.—White reflective elements on polystyrene beads

Example 1 was repeated, except that the quantity of water was doubled and the mica replaced by 390 parts of polystyrene beads averaging 1 mm. in diameter. The surface of the polystyrene beads was slightly roughened by a 2-minute immersion in a solution consisting of 6% $K_2Cr_2O_7$, 74% $H_2SO_4$, and 20% $H_2O$. The coated spheres reflected white light.

Example 19.—Pigment of $SnS_2$ coated on mica flakes

Stannic chloride pentahydrate (31.9 parts) and thioacetamide (14 parts) were dissolved in 800 parts of water. To the solution were added 48 parts of mica flakes. The suspension had a pH value of approximately 0.5.

The reaction mixture was heated to boiling with agitation, and refluxed for two hours. The stannic sulfide-coated mica was filtered, washed with water, and dried at 110° C. to produce a lustrous golden product.

Microscopic examination by reflected light revealed a smooth and uniform stannic sulfide coating on the mica flakes.

Example 20.—$SnS_2$-coated mica pigment with red reflection color

The procedure of Example 19 was followed, except that the quantity of mica flakes were reduced to 24 parts. After drying at 100° C., and incorporating in a nitrocellulose film, the $SnS_2$-coated mica flakes were seen to produce a red color when examined by specular reflection and a yellow color when seen at other angles.

Example 21.—Reflective element from $SnS_2$-coated glass spheres

The procedure of Example 19 was followed, except that the quantity of water was trebled and the mica flakes replaced by 580 parts of glass spheres with an average diameter of 30 microns and an index of refraction of approximately 1.5.

Incorporation in a clear paint vehicle produced a yellow coating material of very high reflectivity.

Example 22.—Pigment of CdS-coated mica

Cadmium chloride (33.3 parts) and thioacetamide (14 parts) were dissolved in 800 parts of water. To the solution were added 48 parts of mica flakes. The suspension was brought to pH 3.0 with hydrochloric acid.

The reaction mixture was thereafter heated to boiling with agitation, and refluxed for 90 minutes, after which the cadmium sulfide-coated mica was filtered, washed with water, and dried at 110° C. to produce a lustrous golden pearl product.

Microscopic examination by reflected light revealed a smooth and uniform cadmium sulfide coating on the mica flakes.

The foregoing examples describe specific procedures for the preparation of the sulfide-coated reflective elements hereof. Comparable coatings may be obtained under a wide variety of conditions. Hence, the compositions of the coating media, the temperature and duration of the heating of such media, and the time and duration of the preferred heat-treatment of the separated elements, may each be widely varied. The present invention may also be effected by use of a sequence or series of steps for building up a thick film comprising a plurality of zinc sulfide layers, rather than the procedure described for forming a single thickness layer. Since these and other changes may be made in the procedure for preparing the novel nacreous pigments hereof, and in the composition of such pigments, without departing from the scope of the invention, it is intended that all matter contained in the above description shall be interpreted as illustrative and not in a limiting sense.

I claim:

1. A nacreous pigment consisting essentially of particulate platelets having major dimensions of from 3 to 100 microns and substantially smooth surfaces, each of said platelets being constituted of a plate-like mica particle of from 200 to 400 mesh having a surface area of from 2 to 6 square meters per gram and bearing, on each of its opposite faces, a zinc sulfide high refractive index layer having an optical thickness $Nd$ of from 40 to 1,000 millimicrons, wherein $N$ is the index of refraction of the zinc sulfide layer and $d$ is the thickness thereof.

2. The nacreous pigment as defined in claim 1, for producing color by light interference phenomena, in which each of the high refractive index layers on each of said mica particles has a substantially uniform thickness of from 200 to 650 millimicrons, and possesses a crystalline compacted structure providing improved light stability.

3. A nacreous pigment constituted of particulate platelets having major dimensions of from 3 to 100 microns and substantially smooth surfaces, each of said platelets including a mica substrate and a pair of high refractive index layers formed on the opposite faces of said substrate and constituted of a water-insoluble metal sulfide, each of said layers having a substantially uniform optical thickness $Nd$ of from 40 to 1000 millimicrons, wherein N is the index of refraction of the layer and $d$ is the thickness thereof.

4. The nacreous pigment defined in claim 3, in which the mica substrates are constituted of mica platelets of from 150 to 400 mesh, having surface areas of from 2 to 6 square meters per gram.

5. A nacreous composition comprising a light-transmitting supporting medium having as a nacre-producing substance therein, the nacreous pigment defined in claim 3.

6. A process for preparing a light-stable, nacreous pigment constituted of particulate platelets having major dimensions of from 3 to 100 microns and substantially smooth surfaces, which comprises:
   (a) admixing smooth, plate-like mica particles of from 150 to 400 mesh, having surface areas of from 2 to 6 square meters per gram, with (1) a water-soluble salt of a metal having a water-insoluble sulfide, and (2) an organic sulfur-containing compound which releases sulfide ions in aqueous media, in an aqueous dispersion;
   (b) heating the resulting reaction mixture at temperatures of from 60° C. to the boiling point of the mixture for a period of from ¼ to 5 hours, with agitation, to produce a sulfide coating on said mica particles while maintaining the same in suspension;
   (c) separating the particulate platelets thereby produced from said suspension; and
   (d) drying said platelets to produce the light-stable, nacreous pigment.

7. The process as defined in claim 6, in which said organic sulfur-containing compound is selected from the group consisting of thioacetamide, thiourea, thioglycolic acid, thioacetic acid, thioformamide, and thiosalicyclic acid.

8. The process as defined in claim 6, in which said water-soluble metal salt is a zinc salt which produces zinc sulfide in said aqueous dispersion, and in which the pigment platelets recovered in step (c) are heated at temperatures of from 200° to 1000° C., to produce the desired light-stable, nacreous pigment.

References Cited

UNITED STATES PATENTS

| | | | |
|---|---|---|---|
| 2,995,459 | 8/1961 | Soloway | 106—291 |
| 3,008,844 | 11/1961 | Grunin | 106—291 |
| 3,123,490 | 3/1964 | Bolomey et al. | 106—291 |

TOBIAS E. LEVOW, *Primary Examiner.*

HELEN M. McCARTHY, JAMES E. POER, *Examiners.*